(12) United States Patent
Hage et al.

(10) Patent No.: US 6,420,514 B1
(45) Date of Patent: Jul. 16, 2002

(54) TRANSPARENT POLYSULFONE ARTICLES WITH REDUCED SPURIOUS COLORATION

(75) Inventors: Martin L. Hage, Maple Grove; Edward A. Travnicek, Ramsey, both of MN (US)

(73) Assignee: Vision - Ease Lens, Inc., Minneapolis, MN (US)

( * ) Notice: Subject to any disclaimer, the term of this patent is extended or adjusted under 35 U.S.C. 154(b) by 89 days.

(21) Appl. No.: 09/615,013

(22) Filed: Jul. 12, 2000

(51) Int. Cl.⁷ .............................................. C08G 75/20
(52) U.S. Cl. ........................ 528/391; 528/373; 528/171; 351/159
(58) Field of Search ................................. 528/391, 373, 528/171; 351/159

(56) References Cited

U.S. PATENT DOCUMENTS

| 5,166,305 A | * 11/1992 | Park et al. ................... 528/125 |
| 5,340,480 A | 8/1994 | Kawata et al. |
| 5,511,985 A | 4/1996 | Noschese et al. |

* cited by examiner

*Primary Examiner*—Duc Truong
(74) *Attorney, Agent, or Firm*—Mark A. Litman & Assoc. P.A.

(57) ABSTRACT

The removal of certain reaction impurities in the manufacture of polysulfone polymers has been found to reduce the undesirable coloration in the final resin. Control of synthesizing reactions, manufacturing processes, and/or purification of specific ingredients assists in the removal of specific, undesirable impurities. The yellowness index, as determined by ASTM D1925 or ASTM E313, in the commercial grades of polysulfone resins has consistently been well above 1.0 for commercial polysulfone resins. The present invention provides polysulfone polymers after processing (e.g., injection molding) where the yellowness index is below 1.00, below 0.75, below 0.50, and even below 0.25.

29 Claims, No Drawings

TRANSPARENT POLYSULFONE ARTICLES WITH REDUCED SPURIOUS COLORATION

BACKGROUND OF THE INVENTION

1. Field of the Invention

The present invention relates to the field of polysulfone polymers, the use of polysulfone polymers in light-transmissive environments, the use of polysulfone polymers in light-transmissive environments where the absence of spurious color is important, and the use of polysulfone polymers in lenses, such as ophthalmic lenses, sports lenses, piano lenses, protective lenses, eye shields, and the like.

2. Background of the Art

Polysulfone polymers have provided a commercial alternative to other transparent polymers for many years. Polysulfones are usually described as a generally clear, rigid, thermoplastic polymer with a glass transition temperature of about 180° C. to about 250° C. Polysulfones can be generally described as containing backbone aromatic rings, which are linked, preferably para-linked, partly by sulfone groups ($-SO_2-$) and partly by dissimilar groups such as an ether linkage or hydrocarbon group (such as an alkyl or alkylene group, or a single bond. In general, the repeating units of a polysulfone may be represented generally by structures as follows:

and/or

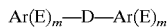

where Ar is a 6 to 20 carbon aromatic radical (substituted or not), preferably phenylene;

D is (a) a divalent radical, of which all or different portions can be (i) linear, branched, cyclic or bicyclic, (ii) aliphatic or aromatic, and/or (iii) saturated or unsaturated, said divalent radical being composed of 1 to 35 carbon atoms together with up to five oxygen, nitrogen, sulfur and/or halogen (such as fluorine, chlorine and/or bromine) atoms; or (b) a divalent S, $SO_2$, SO, O or CO radical; or (c) a single bond;

each E is independently hydrogen, a halogen (such as fluorine, chlorine and/or bromine), a $C_1$ to $C_{12}$, preferably $C_1$ to $C_8$, linear alkyl, branched alkyl, cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; m is 0 or 1; and n is from 1 to about 3, and p is from about 1 to about 500. Preferably, D is a single bond or a divalent hydrocarbyl radical, preferably composed of 1 to 10 carbon atoms, and is preferably isopropylidene. Preferably, each E is independently hydrogen, a halogen, a $C_1$ to $C_8$ alkyl, alkaryl, aralkyl, or aryl radical.

In preferred polysulfones according to the formula above,

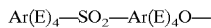

represents a remnant of a bis(4-halophenyl)sulfone (e.g., bis(4-chlorophenyl)sulfone) or a sulfone-bridged bisphenol (e.g., bisphenol S) and

represents a remnant of an optional dihydric compound, preferably 2,2-bis(4-hydroxyphenyl)propane, which is also known as bisphenol A.

Preferred polysulfones are commonly prepared from a bis(4-halophenyl)sulfone and a second, optional dihydric compound, such as bisphenol A, in a dipolar aprotic solvent such as dimethyl sulfoxide or 1-methyl-2-pyrrolidinone. A chloride or bromide may be used as the bis(4-halophenyl) sulfone monomer. Another variety of polysulfone is synthesized from a bisphenol that contains a sulfone bridge (e.g., bisphenol S). The polysulfone component used in the compositions is distinguished from a sulfone-containing polycarbonate in that such polysulfone does not contain carbonate moieties. Of course there may be blends of polysulfones or copolymers of polysulfones with carbonate linkages.

Some examples of polysulfones that are commercially available are Victrex™ polyether polysulfone from ICI Americas, Inc.; Udel™ bisphenol A polysulfone from BP Amoco Polymers, Inc.; Radel® A polyarylethersulfone from BP Amoco Polymers, Inc.; and Radel® polyphenylsulfone from BP Amoco Polymers, Inc.

Other bisphenols, in addition to or as an alternative to bisphenol A, which can be used with the sulfone monomer to prepare a polysulfone polymer include but are not limited to bis(4-hydroxyphenyl)sulfide, bis(4-hydroxyphenyl) oxide, bis(4-hydroxyphenyl)methane, 2,2-bis(4-hydroxydiphenyl)perfluoropropane, 1,1-bis(4-hydroxydiphenyl)cyclohexane, 4,4'-dihydroxybenzophenone, and 4,4'-dihydroxydiphenyl, and substituted counterparts.

Blends of the polysulfone polymers with aryl fluorene carbonate polymer, as shown in U.S. Pat. No. 5,340,480, are known in the manufacture of transparent elements. These blended polymers may have a composition that results in a refractive index of less than about 1.675, preferably less than about 1.670, more preferably less than about 1.666 and at least about 1.600, preferably at least about 1.610 and most preferably at least about 1.615 when measured at about 23° C.

One class of polysulfones particularly suitable for use in transparent compositions, such as those compositions according to the present invention, desirably have a weight average molecular weight of at least about 10,000, preferably at least about 25,000, more preferably at least about 35,000, and most preferably up to about 200,000 or more. Suitable melt flow rates as measured in grams per 10 minutes by ASTM D1238, (343° C., 8.7 kg) range from at least about 1, preferably at least about 2, and more preferably at least about 3, up to about 30, more preferably up to about 20 and most preferably up to about 10.

U.S. Pat. No. 5,511,985 describes a method of manufacturing a polysulfone resin film using the solution casting method wherein a solution of polysulfone resin using at least one solvent is chosen from among anisole, dioxane or tetrahydropyran. Other solvent combinations, such as manufacturing a polysulfone resin film with a solvent chosen from among acetone, 2-butanone, ethyl acetate, toluene and phenol is mixed in the anisole solution, dioxane solution or tetrahydropyran solution of polysulfone resin are also known.

Although the physical and chemical properties of polysulfones and polycarbonates are similar, polycarbonates have achieved a much broader commercial utility. The reasons for this disparity in commercial use is based in part upon the greater convenience of the carbonate reagents versus the sulfone reagents as well as subtle differences in manufacturing capabilities and relatively minor differences in physical properties. One of these minor differences in physical properties is a lack of color consistency or a tendency of the polysulfone polymers to display yellow tones and yellow hues. In spite of the importance of this coloration in limiting the fields of utility of polysulfones in the field of light transmissive articles, there has been little reported on work to correct this problem. There is not even known to be a significant and established explanation for the discoloration.

It would be desirable to identify the nature as well as the causes of the discoloration of polysulfone resins and to provide a polysulfone resin with reduced coloration.

SUMMARY OF THE INVENTION

The removal of certain reaction impurities in the manufacture of polysulfone polymers has been found in the present invention to reduce the undesirable coloration in the final resin. Control of synthesizing reactions, manufacturing processes, and/or purification of specific ingredients assists in the removal of specific, undesirable impurities. The yellowness index, as determined by ASTM D1925 or ASTM E313, in the commercial grades of polysulfone resins has consistently been well above 1.0 for commercial polysulfone resins. The present invention provides polysulfone polymers where the yellowness index is below 1.00, below 0.75, below 0.50, and even below 0.25.

DETAILED DESCRIPTION OF THE INVENTION

"Polysulfone resins" or "polysulfone polymers" are thermoplastic resins obtained by a condensation reaction between reactive diarylsulfone compounds, such as bis(4-chlorophenyl)sulfone or 4-chlorophenyl-4'-hydroxyphenylsulfone and bisphenol A. The polysulfone polymer contains at least one or more polymer units having aryl groups separated by a sulfone ($SO_2$) group as shown in the following chemical formula:

Ar—$SO_2$—Ar, wherein Ar represents a 6 to 20 carbon aromatic radical (e.g., divalent aromatic radical, divalent aromatic-aliphatic radical, etc.), preferably phenylene (with some substitution, including ending or terminating groups present on the aromatic radical, particularly for a chain ending radical, bis-phenylene, 2,2-diphenylene-propane [the residue of bisphenol A], etc.). Other linking groups (in addition to the sulfone group) may also be present. For example, the phenylene units (benzene rings) may be bonded with sulfone groups, ether linkages and isopropylidene groups, and these three bonding components are known to function as internal stabilizers.

Specific examples of these polymers include polysulfone resin whose polymer molecule comprises paraphenylenes interconnected with sulfone, ether and isopropylidene, and polyether sulfone resins whose polymer molecule comprises paraphenylenes interconnected with sulfone and ether. It is preferable for the resin that the average molecular weight (in number average or weight average equivalent) be 20,000 to 200,000 as measured by gel permeation chromatography, size exclusion chromatography or the like. It is not preferable to have said weight average molecular weight lower than this range as the film strength would be reduced. In addition, it is not preferable if the molecular weight is higher than this range because then the viscosity of the resin solution may rise excessively and the appearance and the quality of the product deteriorate. Where slower mold times are acceptable, and good controls are placed on molding and flow rates, higher molecular weights may be tolerated, without necessarily providing better or worse results.

In forming a resin solution for casting or injection molding, polysulfone resins are dissolved in at least one solvent (for example only, chosen among anisole, dioxane, or tetrahydropyran to obtain an anisole solution, dioxane solution or tetrahydropyran solution). It is preferable to adjust the concentration of the polysulfone resin such that the solution viscosity is $1\times10^3$ to $5\times10^6$ cps at the room temperature so that the composition appearance, and smoothness in particular, is maintained when there is leveling. For example, when using a polysulfone resin with a weight average molecular weight (in polystyrene equivalent) of approximately 60,000, it is preferable to prepare the solution such that the resin concentration is 15 to 40 wt %. As the molecular weight increases, it may be desirable, especially for the casting of resins as opposed to the injection molding of resins, to have the range of weight percentage polysulfone polymer in the solution decrease.

When preparing an anisole solution of polysulfone resin, anisole may be used independently. However, for the purpose of lowering the boiling point of the solution below that of pure anisole (approximately 154° C.) and thus making the drying time even shorter, improving productivity, and also for the purpose of lowering the viscosity of the anisole solution for a better coating appearance, it is also possible to mix in a "poor solvent", i.e., a solvent that is compatible with anisole, does not deteriorate transparency and/or stability during storage of the polysulfone resin solution, has a lower boiling point than anisole, and does not dissolve more than 1 wt % of polysulfone resin. Examples include one or more solvents chosen from among acetone, 2-butanone, ethyl acetate, toluene and phenol, or a mixture of these. When mixing the poor solvent described above in anisole, the content of the poor solvent should be 60 wt % or less of the total solvent (the mixture of anisole and the poor solvent). It is preferred that the content of the poor solvent be 60 wt % or less because if it is higher, the solubility of the polysulfone resin can deteriorate, resulting in defects such as fish-eyes.

When preparing the dioxane solution of polysulfone resin, dioxane may be used independently. However, for the purpose of lowering the boiling point of the solution below that of pure dioxane (approximately 102° C.) and thus making the drying time even shorter, improving productivity, and also for the purpose of lowering the viscosity of the dioxane solution for a better coating appearance, it is also possible to mix in a "poor solvent", i.e., a solvent that is compatible with dioxane, does not deteriorate transparency and/or stability during storage of the polysulfone resin solution, has a relatively low boiling point, and does not dissolve more than 1 wt % of polysulfone resin. Examples of such poor solvents include one or more solvents chosen from among acetone, 2-butanone, ethyl acetate, toluene and phenol, or a mixture of these. When mixing the poor solvent described above in dioxane, the content of the poor solvent should be 60 wt % or less of the total solvent (the mixture of dioxane and the poor solvent). It is preferred that the content of the poor solvent be 60 wt % or less because if it is higher, the solubility of the polysulfone resin can deteriorate, resulting in defects such as fish-eyes.

When preparing the tetrahydropyran solution of polysulfone resin, tetrahydropyran may be used independently. However, for the purpose of lowering the boiling point of the solution to less that of pure tetrahydropyran (approximately 88° C.) and thus making the drying time even shorter, improving productivity, and also for the purpose of lowering the viscosity of the tetrahydropyran solution for a better coating appearance, it is also possible to mix in a "poor solvent", i.e. a solvent that is compatible with tetrahydropyran, does not deteriorate transparency and/or stability during storage of the polysulfone resin solution, has a relatively low boiling point, and does not dissolve more than 1 wt % of polysulfone resin. Examples include one or more solvents chosen from among acetone, 2-butanone, ethyl acetate, toluene and phenol, or a mixture of these. When mixing the poor solvent described above in tetrahydropyran, the content of the poor solvent should be 60 wt % or less of the total solvent (the mixture of tetrahydropyran and the poor solvent). It is preferred to have the content of the poor solvent be 60 wt % or less because if it is higher the solubility of the polysulfone resin can deteriorate, again resulting in defects such as fish-eyes.

It is also desirable to use a solvent or cosolvent that is not excessively volatile, since very volatile solvents tend to evaporate so quickly as to cause wrinkling, orange peel or other surface defects in addition to causing the film to cool below the dew point of the surrounding air thereby causing water to condense onto the film from the surrounding air, resulting in a haze that may be permanent.

The temperature at which the polysulfone resin is dissolved in the solvent is not necessarily room temperature. For example, when preparing the anisole solution, it is possible to improve the dissolution rate of said resin by means of heating, as long as the temperature stays at the boiling point of anisole (154° C.), or lower. In this case, it is necessary to pay attention to the amount of the vaporized solvent. When preparing the dioxane solution, it is possible to improve the dissolution rate of said resin by means of heating, as long as the temperature stays at the boiling point of dioxane (102° C.) or lower. When preparing the tetrahydropyran solution, it is possible to improve the dissolution rate of said resin by means of heating, as long as the temperature stays at the boiling point of tetrahydropyran (88° C.) or lower.

A plasticizer can be added to the polysulfone resin solution as necessary so as to improve the flexibility of the film. Examples of suitable plasticizers include the phthalate ester type, phosphate ester type, adipate ester type, citrate ester type, and glycolate ester type. Specifically, diethyl phthalate, butylbenzyl phthalate, tricresyl phosphate and methyl phthalyl ethyl glycolate are preferable because they have a high compatibility with polysulfone resin and they do not cause a defective appearance such as devitrification. Although up to 30 wt % of said plasticizer can be added to the polysulfone resin, the amount should preferably be 10 wt % or less of said resin.

The yellowness index should be below 1.00, below 0.75, preferably below 0.50, and most preferably below 0.25. The presently available UDEL® P-1700 polysulfone resin is acceptable for the refractive index and Abbe number desirable for ophthalmic lenses, although higher values are always desirable. The resin shows a yellowness index of well above 1.00, which would enable its use only with additional lens coloration, and that additional coloration should be tolerant of yellow hues and tones to be acceptable. One other aspect that should be noted is that, even though or even because the nature of the undesirable coloration was not clearly identified, present polysulfone polymers would display significant variations in yellow coloration, although above at least 1.00 yellowness index. A tintable scratch resistant coating (e.g., a silane resin, epoxy resin, epoxy silane resin, etc.) will be used as a surface coating for polysulfone lenses, as is often done for polycarbonate materials. The tint will again partially mask yellow tones and hues of the polysulfone, but adjustments in color of the tint would have to be made on a lot-by-lot basis to match the variations in yellow tones present in prior art polysulfone resins.

The yellow color in the polysulfones seems to develop or worsen during the injection molding process and during the polymerization process. In fact, some lots of the purported higher quality grades of polysulfone resins have had a color factor in the teens, which would be a yellowness index of about 1.00, even before processing to form pellets than could be used for injection molding. However, additional color develops in the next step of the manufacturing process due to additional heat history and an increase in concentration of the colorizing ingredients as the sulfone processing solvent is removed. Contact with certain metals during processing also tends to increase the coloration, although the cause of this result is not understood. Yellowing has been found by the inventors to be somewhat moderated in both prior art during injection molding by avoiding higher temperatures and longer residence times, both of which tend to generate more color. The present invention also identified specific process materials and conditions that can be used to minimize and further reduce yellowness.

There are generally at least two grades of bisphenol A that are manufactured commercially: the epoxy grade, and the polycarbonate grade. The polycarbonate grade is higher purity and is used to make optical quality polycarbonate. A typical commercial epoxy grade bisphenol A contains greater than 3.0 percent total organic impurities, whereas a typical polycarbonate grade bisphenol A, such as the material from Shell Chemical, contains slightly less than 0.3 percent total organic impurities by weight or molar basis. There are three isomers of bisphenol A that appear in the bisphenol A of commerce, including the two isomers that will be considered as impurities. The isomers are referred to as para-para (the preferred component), ortho-para (an impurity), and ortho-ortho (another impurity). The group that is identified on the phenyl ring as ortho- or para- is the hydroxy group (or other reactive group, such as chloro). The para-para form is the desired isomer and is by far the major component in either grade. In both grades of bisphenol A, about 99 percent of the total organic impurities is the ortho-para isomer and there is a trace of the ortho-ortho isomer. The weight ratio of these two isomers respectively is roughly 100:1 (ortho-para/ortho-ortho). Of the three isomers of bisphenol A, the para-para isomer is the least susceptible to oxidation to form a highly colored quinone compound and the ortho-ortho isomer is the most susceptible. The ortho-para isomer is intermediate with regard to ease of oxidation. Although the ortho-para isomer is less readily oxidized than the ortho-ortho isomer, it may be a greater contributor to color by virtue of the fact that it is present at roughly 100 times the concentration of the ortho-ortho isomer. Shell Chemical produces only one grade of bisphenol A, the high purity polycarbonate grade, which is believed to be similarly constituted by way of impurities in comparison to the polycarbonate grade bisphenol A from other producers. Polysulfone resins produced from this bisphenol A source using conventional manufacturing conditions and materials also produce a yellowness index in excess of 1.00.

Although high purity bisphenol A is known in the market, with General Electric being a captive producer of high purity bisphenol A, these purported high purity bisphenol A products are not known to be used in the manufacture of optical or ophthalmic quality polysulfone resins. Polycarbonate grade bisphenol A can be further purified via recrystallization or other techniques to reduce the yellowness and to reduce the concentration of the impurities that generate color during the production of polysulfone.

One basis for the yellowness in polysulfones is believed to be the formation of quinone or phenolate moieties, which are known to have a yellow color and a high extinction coefficient. This belief is substantiated by past experience and also helps to explain the unexpected observation that the higher molecular weight materials had less color. The higher molecular weight material would have fewer phenolic end groups resulting from the bisphenol A, and hence fewer phenolate or quinone chromophores could be formed by the action of strong bases, which are commonly used in the manufacture of polysulfones. Strong bases, such as sodium hydroxide, can react with phenolic compounds to generate phenolate ions and can catalyze the formation of quinone moieties, both of which are intensely colored chromophores.

For this reason, even for a batch process, the concentration of base at any one point in time should be kept to a minimum by the continuous addition of a small stream of base, and that, within the constraints of an acceptable reaction rate, the total amount of base that is used should be reduced as much as possible to minimize the amount of residual phenolate ions that are present after processing. For the same reason, a weaker base may also be of benefit. It is commonly known in the industry that the synthesis of the Radel®R products utilizes a weaker base, potassium carbonate, as opposed to sodium hydroxide, although no specific purpose for this difference is publicly available. The process may be performed with sodium hydroxide, potassium hydroxide, sodium carbonate, or potassium carbonate, and mixtures thereof to reduce the alkalinity of the reaction mixture and thereby reduce the phenolate content.

It is desirable to use an inert gas to eliminate air from the reactor during the processing to prevent the oxidation of the phenolic end groups to quinones. The use of nitrogen as an air replacement would be effective and is best performed as a sparge rather than as a blanket of nitrogen. After charging the reactor, nitrogen could be used to completely expunge all of the air, oxygen in particular, from the reactor prior to commencing polymerization. It is also desirable to pull vacuum, then fill the reactor with nitrogen, and repeat this several times to ensure the complete removal of oxygen from the reactor.

There is some color development during the sulfolane removal step, which commends the inventors to use vacuum to facilitate the process, minimizing the amount of heat that is needed, and reducing the amount of air that is present during this step. There should be careful control regarding air leaks into the reactor or other vessel being used for processing. Air leaks may be readily formed and difficult to find but would provide a steady supply of oxygen, which, at elevated temperature, could oxidize the phenolic end groups to form highly colored quinone chromophores. A chemical reducing agent could be used to help prevent this oxidation from occurring.

The use of chlorobenzene, 4-chlorotoluene, or similar materials as terminators in the synthesis of polysulfone polymers might be an improvement over those commercial polymers that do not use a terminator. The use of chlorobenzene or another phenolic reactive material as a terminator might help eliminate some color from the polysulfone products through the reduction in the number of phenolic end groups, which might be undergoing ionization and oxidation to be converted to intensely colored phenolate ions or quinone moieties respectively.

In addition to the alternative use of chlorobenzene, there might be other more reactive terminating agents to eliminate the residual phenolic end groups or phenolate ions, and thereby prevent quinone formation or phenolate formation. Possible terminating agents include acyl chlorides and oxirane compounds. The former would produce hydrochloric acid as a byproduct, which should not pose any problems, as hydrochloric acid is already being produced in much larger quantities as a byproduct of polymerization. The latter would produce no byproduct at all. The use of an isocyanate functional material is not recommended, as the resulting urethane is not very stable.

Another possible approach to reduced color is to neutralize the reaction mixture with hydrochloric acid to reduce the phenolate ion concentration. This preferably would be done after the polymerization is complete. Bisphenol A is only half of the monomer equation, as there is also a possibility that one or more contaminants exist in the other monomer, bis(4-chlorophenyl)sulfone, and is contributing to the color. Furthermore, it may be that the high pH of the reaction mixture, particularly during the early stages of polymerization, results in the replacement of the chloro groups on bis(4-chlorophenyl)sulfone with hydroxyl groups via nucleophilic substitution. This reaction would provide another source of phenolic material that could be ionized to phenolate ions or oxidized to quinones and therefore any ortho-para or ortho-ortho isomers in the bis(4-chlorophenyl) sulfone would contribute problems analogous to those for of the same isomers of bisphenol A. For this reason, in addition to high purity bisphenol A, the sulfone monomer should also be of high purity for the production of low color polysulfone.

The polysulfone polymer materials of this invention may be used in all of the fields and environments that polycarbonate materials are used in, such as by way of non-limiting examples, panels, windows, screens, face masks, sports lenses, sport masks, ophthalmic lenses, containers, frames, and other fields of use compatible with the uses of polycarbonates.

What is claimed:

1. A method of providing a polysulfone polymer with low yellow coloration comprising reacting 2,2-bis(4-hydroxyphenyl)propane with at least one diarylsulfone compound to form a low-color content polysulfone polymer, wherein the 2,2-bis(4-hydroxyphenyl)propane comprises less than 0.27% by total weight of 2-(4-hydroxyphenyl)-2-(2-hydroxyphenyl)propane and 2,2-bis(2-hydroxyphenyl) propane.

2. The method of claim 1 wherein the at least one diarylsulfone compound comprises two aryl groups bridged by a sulfone group.

3. The method of claim 2 wherein each aryl group is substituted with one reactive group selected from the group consisting of halogen, cyano, and hydroxyl, with multiple substituents, if any, being either the same or different on each molecule.

4. The method of claim 1 wherein the at least one diarylsulfone is selected from the group consisting of bis(4-chlorophenyl)sulfone or 4-chlorophenyl-4'-hydroxyphenylsulfone.

5. The method of claim 1 wherein the low-color content polysulfone polymer is injection molded at a temperature of at least 100° C. to produce a transparent polymeric material with a color index of less than 1.00.

6. The method of claim 2 wherein the low-color content polysulfone polymer is injection molded at a temperature of at least 100° C. to produce a transparent polymeric material with a color index of less than 1.00.

7. The method of claim 3 wherein the low-color content polysulfone polymer is injection molded at a temperature of at least 100° C. to produce a transparent polymeric material with a color index of less than 1.00.

8. The method of claim 4 wherein the low-color content polysulfone polymer is injection molded at a temperature of at least 100° C. to produce a transparent polymeric material with a color index of less than 1.00.

9. The method of claim 1 wherein the low-color content polysulfone polymer is injection molded at a temperature of at least 100° C. to produce a transparent polymeric material with a color index of less than 0.75.

10. The method of claim 4 wherein the low-color content polysulfone polymer is injection molded at a temperature of at least 100° C. to produce a transparent polymeric material with a color index of less than 0.75.

11. The method of claim 1 wherein a 2,2-bis(4-hydroxyphenyl)propane composition is recrystallized to form 2,2-bis(4-hydroxyphenyl)propane that comprises less than 0.27% by total weight of 2-(4-hydroxyphenyl)-2-(2-hydroxyphenyl)propane and 2,2-bis(2-hydroxyphenyl)propane.

12. The method of claim 1 wherein the 2,2-bis(4-hydroxyphenyl)propane comprises less than 0.25% by total weight of 2-(4-hydroxyphenyl)-2-(2-hydroxyphenyl)propane and 2,2-bis(2-hydroxyphenyl)propane.

13. The method of claim 4 wherein the 2,2-bis(4-hydroxyphenyl)propane comprises less than 0.25% by total weight of 2-(4-hydroxyphenyl)-2-(2-hydroxyphenyl)propane and 2,2-bis(2-hydroxyphenyl)propane.

14. The method of claim 2 wherein the 2,2-bis(4-hydroxyphenyl)propane comprises less than 0.20% by total weight of 2-(4-hydroxyphenyl)-2-(2-hydroxyphenyl)propane and 2,2-bis(2-hydroxyphenyl)propane.

15. The method of claim 5 wherein the 2,2-bis(4-hydroxyphenyl)propane comprises less than 0.25% by total weight of 2-(4-hydroxyphenyl)-2-(2-hydroxyphenyl)propane and 2,2-bis(2-hydroxyphenyl)propane and the color index of the polysulfone resin is less than 0.75.

16. The method of claim 8 wherein the 2,2-bis(4-hydroxyphenyl)propane comprises less than 0.25% by total weight of 2-(4-hydroxyphenyl)-2-(2-hydroxyphenyl)propane and 2,2-bis(2-hydroxyphenyl)propane and the color index of the polysulfone resin is less than 0.75.

17. The method of claim 5 wherein the 2,2-bis(4-hydroxyphenyl)propane comprises less than 0.20% by total weight of 2-(4-hydroxyphenyl)-2-(2-hydroxyphenyl)propane and 2,2-bis(2-hydroxyphenyl)propane and the color index of the polysulfone resin is less than 0.75.

18. The method of claim 5 wherein the 2,2-bis(4-hydroxyphenyl)propane comprises less than 0.15% by total weight of 2-(4-hydroxyphenyl)-2-(2-hydroxyphenyl)propane and 2,2-bis(2-hydroxyphenyl)propane and the color index of the polysulfone resin is less than 0.50.

19. A transparent, low yellow-coloration polysulfone layer comprising a polysulfone polymer derived from reactants comprising a 2,2-bis(4-hydroxyphenyl)propane and at least one diarylsulfone compound, wherein the 2,2-bis(4-hydroxyphenyl)propane comprises less than 0.27% by total weight of 2-(4-hydroxyphenyl)-2-(2-hydroxyphenyl)propane and 2,2-bis(2-hydroxyphenyl)propane.

20. A transparent, low yellow-coloration polysulfone ophthalmic lens comprising a polysulfone polymer derived from reactants comprising a 2,2-bis(4-hydroxyphenyl)propane and at least one diarylsulfone compound, wherein moieties in the polysulfone derived from the 2,2-bis(4-hydroxyphenyl)propane comprises units wherein fewer than 0.27% by total weight of the 2,2-bis(4-hydroxyphenyl)propane comprises 2-(4-hydroxyphenyl)-2-(2-hydroxyphenyl)propane and 2,2-bis(2-hydroxyphenyl)propane.

21. The layer of claim 19 wherein the layer has a color index of less than 1.00.

22. The lens of claim 20 wherein the polysulfone polymer has a color index of less than 1.00.

23. The lens of claim 20 wherein the polysulfone polymer has a color index of less than 0.75.

24. The lens of claim 20 wherein the polysulfone polymer has a color index of less than 0.50.

25. A transparent, low yellow-coloration polysulfone, injection-molded ophthalmic lens comprising a polysulfone polymer derived from reactants comprising a 2,2-bis(4-hydroxyphenyl)propane and at least one diarylsulfone compound, wherein moieties in the polysulfone derived from the 2,2-bis(4-hydroxyphenyl)propane comprises units wherein fewer than 0.27% by total weight of the 2,2-bis(4-hydroxyphenyl)propane comprises 2-(4-hydroxyphenyl)-2-(2-hydroxyphenyl)propane and 2,2-bis(2-hydroxyphenyl)propane.

26. The layer of claim 25 wherein the layer has a color index of less than 1.00.

27. The lens of claim 25 wherein the polysulfone polymer has a color index of less than 1.00.

28. The lens of claim 25 wherein the polysulfone polymer has a color index of less than 0.75.

29. The lens of claim 25 wherein the polysulfone polymer has a color index of less than 0.50.

* * * * *